(12) United States Patent
Kraiter et al.

(10) Patent No.: US 6,413,306 B1
(45) Date of Patent: Jul. 2, 2002

(54) PIGMENT DISPERSIONS CONTAINING ABC-BLOCK POLYMER DISPERSANT

(75) Inventors: Daniel C. Kraiter, Wilmington, DE (US); Beatriz E. Rodriguez-Douglas, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/414,255

(22) Filed: Oct. 7, 1999

(51) Int. Cl.[7] .................. C09D 17/00; C08L 153/00; C08F 293/00; C08F 297/00
(52) U.S. Cl. ................. 106/31.85; 106/31.86; 106/499; 524/529; 524/531; 524/533; 524/535; 524/555; 525/244; 525/294; 525/296; 525/297; 525/299; 525/303; 525/308; 525/309; 525/312
(58) Field of Search .............. 106/31.85, 31.86, 106/499; 524/429, 531, 533, 535, 555; 525/244, 294, 296, 297, 299, 303, 308, 309, 312

(56) References Cited

U.S. PATENT DOCUMENTS

| | | | |
|---|---|---|---|
| 4,414,372 A | 11/1983 | Farnham et al. | 526/190 |
| 4,417,034 A | 11/1983 | Webster | 526/190 |
| 4,508,880 A | 4/1985 | Webster | 526/190 |
| 4,524,196 A | 6/1985 | Farnham et al. | 526/190 |
| 4,656,226 A | 4/1987 | Hutchins et al. | 525/93 |
| 4,755,563 A * | 7/1988 | West | 525/287 |
| 4,812,517 A | 3/1989 | West | 525/94 |
| 4,822,674 A | 4/1989 | Malhotra et al. | 428/336 |
| 4,939,283 A | 7/1990 | Yokota et al. | 558/33 |
| 5,025,060 A | 6/1991 | Yabuta et al. | 524/533 |
| 5,085,698 A * | 2/1992 | Ma et al. | 106/20 |
| 5,219,945 A * | 6/1993 | Dicker et al. | 525/276 |
| 5,221,334 A | 6/1993 | Ma et al. | 106/20 D |
| 5,310,778 A | 5/1994 | Shor et al. | |
| 5,519,085 A * | 5/1996 | Ma et al. | 524/503 |
| 5,708,072 A | 1/1998 | Tulacs et al. | 524/507 |
| 5,713,993 A * | 2/1998 | Page et al. | 106/31.85 |

FOREIGN PATENT DOCUMENTS

| | | |
|---|---|---|
| EP | 0 447 998 | 9/1991 |
| EP | 0 744 662 | 11/1996 |
| EP | 823440 | 2/1998 |
| JP | 11269418 A | 10/1994 |
| JP | 08253654 | 10/1996 |
| JP | 2000169531 | 6/2000 |
| WO | WO 98/11143 | 3/1998 |

* cited by examiner

*Primary Examiner*—David W. Wu
*Assistant Examiner*—Kelechi Egwim
(74) *Attorney, Agent, or Firm*—Steven C. Benjamin

(57) ABSTRACT

A pigment dispersion useful for forming coating compositions containing dispersed pigment, a non-aqueous carrier liquid and an ABC-block polymer dispersant (binder); wherein the ABC block polymer has a number average molecular weight of about 5,000–20,000 and contains a polymeric A segment, a polymeric B segment and a polymeric C segment; wherein the polymeric A segment of the block polymer is of polymerized monomers selected from the following group: alkyl (meth)acrylate monomers having 1–12 carbon atoms in the alkyl group, aryl (meth)acrylate monomers, cyclo alkyl (meth)acrylate monomers or mixtures of any of the above;

the polymeric B segment of the block polymer is of polymerized alkyl amino alkyl (meth)acrylate monomers having 1–4 carbon atoms in the alkyl group quaternized with an alkylating agent; and the polymeric C segment of the block polymer is of polymerized monomers of hydroxy alkyl (meth) acrylate having 1–4 carbon atoms in the alkyl group and monomers selected from the following group: alkyl (meth)acrylate monomers having 1–12 carbon atoms in the alkyl group, aryl (meth)acrylate monomers, cycloalkyl (meth)acrylate monomers and any mixtures thereof and optionally contains polymerized monomers of glycidyl (meth)acrylate or polyalkylene glycol (meth)acrylate; wherein the weight ratio of pigment to binder in the dispersion is about 1/100–200/100; pigment dispersions of a CBA block polymer where the C,B and A segments are as described above also are part of this invention.

13 Claims, No Drawings

PIGMENT DISPERSIONS CONTAINING ABC-BLOCK POLYMER DISPERSANT

FIELD OF THE INVENTION

This invention relates to an improved pigment dispersion containing an ABC-block polymer dispersant.

BACKGROUND OF THE INVENTION

AB block polymer dispersants are known in the art and are used to form pigment dispersions that are used in a variety of coating compositions. U.S. Pat. No. 4,656,226 issued Apr. 7, 1987, to Hutchins et al shows an AB block polymer dispersant having polar groups such as acids or amines that attach to a pigment's surface and the other block of the polymer keeps the pigments stable in the dispersion or coating composition. U.S. Pat. No. 5,221,334 issued Jun. 22, 1994, to Ma et al also shows AB or BAB block polymers that are used in aqueous printing inks to keep pigments dispersed in the inks. ABC triblock polymers have been used in aqueous ink jet inks to disperse pigments in these inks as shown in U.S. Pat. No. 5,519,085 issued May 21, 1996 to Ma et al.

These block polymers are made by known "living" free radical polymerization techniques, also referred to as group transfer polymerization (GTP). In GTP, an initiator splits with one end going to the tail of an acrylic monomer unit and the other to the head. The group at the head transfers to the head of a second monomer unit as that unit is polymerized with the first. Such techniques are described in U.S. Pat. No. 4,417,034 issued Nov. 22, 1983, and U.S. Pat. No. 4,508,880 issued Apr. 2, 1985, to O. W. Webster and U.S. Pat. No. 4,414,372 issued Nov. 8, 1983, and U.S. Pat. No. 4,524,196 issued Jun. 18, 1985 to Farnham et al. The above patents are hereby incorporated by reference.

Conventional truck and automobile finishes comprise a clear coat applied over a pigmented base coat that is applied over a primer layer. The polymer dispersant used in the base coat must not only keep the pigment dispersed in the liquid coating composition but needs to contain a reactive group that will react with the crosslinking agent used in the coating composition which on curing makes the dispersant an integral part of the resulting finish. Polymer dispersants can cause intercoat adhesion failures and usually are used only in limited amounts. It is desirable that the polymer dispersant have reactive groups that will bond with the primer layer to improve intercoat adhesion of the base coat to the primer rather than cause intercoat adhesion problems and cause flaking and chipping of the resulting finish.

SUMMARY OF THE INVENTION

A pigment dispersion useful for forming coating compositions containing dispersed pigment, a non-aqueous carrier liquid and an ABC-block polymer dispersant (binder);

the ABC block polymer has a number average molecular weight of about 5,000–20,000 and contains a polymeric A segment, a polymeric B segment and a polymeric C segment; wherein the polymeric A segment of the block polymer is of polymerized monomers selected from the following group: alkyl (meth)acrylate monomers having 1–12 carbon atoms in the alkyl group, aryl (meth)acrylate monomers, cycloalkyl (meth)acrylate monomers or mixtures of any of the above;

the polymeric B segment of the block polymer is of polymerized alkyl amino alkyl (meth)acrylate monomers having 1–4 carbon atoms in the alkyl group quaternized with an alkylating agent; and the polymeric C segment of the block polymer is of polymerized monomers of hydroxy alkyl (meth)acrylate having 1–4 carbon atoms in the alkyl group and monomers selected from the following group: an alkyl (meth)acrylate having 1–12 carbon atoms in the alkyl group, an aryl (meth)acrylate, or a cycloalkyl (meth)acrylate and optionally contains polymerized monomers of glycidyl (meth)acrylate or polyalkylene glycol (meth)acrylate;

wherein the weight ratio of pigment to binder in the dispersion is about 1/100–200/100.

Pigment dispersions of a CBA block polymer where the C,B and A segments are as described above also are part of this invention.

DETAILED DESCRIPTION OF THE INVENTION

The term (meth)acrylate refers to both the acrylate and methacrylate esters.

The novel pigment dispersion is stable and in general is non-flocculated or agglomerated and is compatible with a variety of polymeric film forming binders that are conventionally used in coating compositions and in particular, compatible with polymers that are used in coating compositions. The ABC block polymer dispersant upon curing of the coating composition into which it has been incorporated, reacts with other film forming components of the coating composition such as the polyisocyanate crosslinking agent and becomes part of the film and does not cause deterioration of the film upon weathering as may occur if it remained an unreacted component of the film. Also, since the ABC block polymer is an excellent dispersant, the ratio of polymer to pigment or polymer being dispersed is less than used with conventional dispersants and a large variety of pigments and polymers can be dispersed thereby enlarging the number and types of pigment dispersions that can be formulated. The ABC block polymer has reactive groups that improve adhesion to a primer layer thereby reducing flaking and chipping of the coating composition.

It has been found that improved coating compositions are obtained by using these novel pigment dispersions. These coating compositions also contain a film forming binder usually an acrylic polymer and a curing agent such as a polyisocyanate or an alkylated melamine. Such compositions have the advantage of providing excellent coating properties desirable for automotive finishes. Base coats of conventional base coat/clear coat finishes currently used on automobiles and trucks colored with pigment dispersions of this invention have significantly improved depth of color in comparison to base coats colored with conventional pigment dispersions.

The ABC block polymer used to formulate the dispersion of this invention can be prepared by anionic polymerization, atom transfer polymerization or by GTP (Group Transfer Polymerization) techniques. Preferably, the polymer is prepared using GTP techniques as described in the aforementioned GTP patents (U.S. Pat. Nos. 4,417,034, 4,508,880, 4,414,372 and 4,524,196). These polymers have a number average molecular weight of 5,000–20,000 and preferably 7,500–12,000. The A segment of the polymer comprises 20–60% (preferably 32–42%) by weight of the polymer, the B segment of the polymer comprises 20–60% (preferably 15–40%) by weight of the polymer and the C segment of the polymer comprises 20–60% (preferably 35–45%) by weight of the polymer.

All molecular weights referred herein can be determined by GPC (gel permeation chromatography) using a polymethylmethacrylate standard.

The A segment of the ABC block polymer is relatively nonpolar in comparison to the B and C segments and provides steric stabilization of the pigment dispersion. The B segment is polar and contains groups that bind to the pigment particles through polar-polar interactions. The C segment contains mostly polymerized nonpolar monomers and contains functional hydroxyl groups, amino groups and other functional groups such as glycidyl groups, amino groups, and alkylene glycol groups. These groups provide co-valent bonding with film forming components of the coating composition to which the dispersion has been added.

The ABC block polymer preferably is prepared by using GTP techniques. In an inert atmosphere such as nitrogen, solvent such as THF (tetrahydrofuran), toluene, propylene glycol methyl ether acetate, tetraglyme or mixtures of such solvents, a catalyst such as tetrabutyl ammonium m-chlorobenzoate and initiator such as 1-methoxy-1-trimethylsiloxy-2-methyl propene are charged into a polymerization vessel. Then the A segment monomers are added. Typical reaction temperatures used are room temperature to 70° C. for 45–90 minutes. When at least 95% of the monomers have been polymerized, the monomers for the B segment of the polymer are added. Typical reaction temperature is about 30–70° C. and reaction times are about 30–100 minutes or until at least 95% of the monomers have been polymerized. The monomers of segment C are added and reacted at about 30–60° C. for about 60–90 minutes or until all of the monomers have been reacted. All conversion of monomers to form polymer are determined by High Pressure Liquid Chromatography. After the polymerization is complete, the polymer solution is quenched with water or an alcohol and then most of the original solvent, if it is a low boiling solvent, such as THF, is striped off and replaced with solvents such as propylene glycol methyl ether acetate. An alkylating agent then is added to quaternize the amine groups of the B segment and the reaction mixture is held at its reflux temperature of about 95–105° C. for about 2–3 hours or until quaternization is completed to form a solution of the ABC block polymer used to form the dispersions of this invention.

Other typical solvents, GTP polymerization catalysts and initiators used to form the ABC block polymers are disclosed in the aforementioned GTP patents.

The A segment of the polymer is nonpolar and contains mainly polymerized alkyl (meth)acrylate monomers having 1–12 carbon atoms in the alkyl groups such as methyl methacrylate, ethyl acrylate, ethyl methacrylate, propyl acrylate, isopropyl acrylate, propyl methacrylate, isopropyl methacrylate, butyl acrylate, isobutyl acrylate, tertiary butyl acrylate, butyl methacrylate, isobutyl methacrylate, tertiary butyl methacrylate, pentyl acrylate, pentyl methacrylate, hexyl acrylate, hexyl methacrylate, octyl acrylate, octyl methacrylate, 2-ethylhexyl acrylate, 2-ethylhexyl methacrylate, nonyl acrylate, nonyl methacrylate, decyl acrylate, decyl methacrylate, lauryl acrylate, and lauryl methacrylate.

The A segment of the polymer also can contain polymerized aryl (meth)acrylate monomers such as benzyl methacrylate, benzyl acrylate, ethylene glycol phenyl ether methacrylate, ethylene glycol phenyl ether acrylate and may contain polymerized cycloalkyl (meth)acrylate monomers such as cyclohexyl methacrylate, cyclohexyl acrylate or isobornyl methacrylate.

The B-segment of the polymer is polar and contains polymerized alkyl amino alkyl (meth)acrylate monomers that are quaternized with an alkylating agent. Typically useful alkyl amino alkyl (meth)acrylate monomers are dimethyl amino ethyl methacrylate, dimethyl amino ethyl acrylate, methyl ethyl amino ethyl methacrylate, methyl ethyl amino ethyl acrylate, dimethyl amino ethyl methacrylate, diethyl amino ethyl methacrylate, t-butyl amino ethyl methacrylate, and t-butyl amino ethyl acrylate. One preferred monomer for the B segment is N,N-dimethylaminoethyl methacrylate.

Typical alkylating agents have the general formula

where R is H, a lower alkyl group having 1–4 carbon atoms or an aromatic group such as phenyl or a substituted phenyl. Typically useful alkylating agents are benzyl chloride, methyl iodide, ethyl iodide and benzyl iodide.

Other useful alkylating agents include alkyl sulfates such as dimethyl sulfate, diethyl sulfate, and methyl toluene sulfonate (methyl tosylate).

The C-segment of the block polymer is mostly nonpolar and contains functional groups, in particular hydroxyl groups and other reactive groups to provide steric stabilization and covalent bonding to the film forming component of the coating composition to which a dispersion of the ABC block polymer is added. Typically useful monomers are hydroxy alkyl (meth)acrylates having 2–4 carbon atoms in the alkyl group such as hydroxy ethyl methacrylate, hydroxy ethyl acrylate, hydroxy propyl methacrylate, hydroxy propyl acrylate, hydroxy butyl methacrylate, hydroxy butyl acrylate and any mixtures thereof. In GTP polymerization only monomers having blocked hydroxy groups can be used which are then unblocked to form the hydroxy groups on the polymer. The following are typical blocked hydroxy monomers useful for GTP polymerization: silane blocked hydroxy alkyl methacrylates having 2–4 carbon atoms in the alkyl group such as trimethylsiloxyethyl methacrylate, trimethylsiloxypropyl methacrylate and trimethylsiloxybutyl methacrylate.

The following monomers also can be used to form the C-segment: glycidyl methacrylate, glycidyl acrylate, polyalkylene glycol (meth)acrylate such as polyethylene glycol methacrylate, polypropylene glycol methacrylate, polyethylene glycol acrylate, polypropylene glycol acrylate, alkoxy polyalkylene glycol methacrylates such as ethoxy triethylene glycol methacrylate, methoxy polyethylene glycol methacrylate and any mixtures of the above monomers.

In one preferred embodiments, the ABC block polymer contains in the A-segment 32–42 parts by weight of methyl methacrylate/butyl methacrylate (MMA/BMA), B-segment 20–30 parts by weight of dimethyl amino ethyl methacrylate (DMAEMA) and C-segment 35–45 parts by weight of methyl methacrylate/butyl methacrylate/hydroxy ethyl methacrylate (MMA/BMA/HEMA).

Suitable other olefinically unsaturated monomers that can be used in minor amounts in the ABC block polymer when an anionic polymerization process is used to form the polymer include: maleic, itaconic and fumaric anhydride and their diesters; vinyl aromatics such as styrene, alpha methyl styrene and vinyl toluene and polyethylene glycol mono(meth)acrylates.

A CBA block polymer also can be formed and is part of this invention. In forming a CBA block polymer, the C segment is first made using the same procedure as above and then the monomers for the B segment are added and after the B segment is formed the monomers for the A segment are added and polymerized. A different initiator, but the same catalysts and solvents are used as described above for the C,B and A segments.

The ABC block polymer is used as a dispersing resin to disperse a wide variety of pigments that are commonly used in coating compositions. Typical pigments that are used are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones and the like.

To form the pigment dispersion of this invention the ABC block polymer, solvent, optionally a grinding resin such as an acrylic resin or a polyester resin and the pigment to be dispersed are added to a suitable grinding vessel such as an attritor, sand mill, ball mill or two roll mill and then ground for about 5 minutes–12 hours to form a pigment dispersion. Typically these pigment dispersions have a yield stress of about 0–1,000 Pa (Pascal), a low shear (20 sec-1) viscosity of about 100–10,000 m. Pas (milli Pascal seconds) and a high shear (1,000 sec-1) viscosity of about 10–1,000 m Pas measured on a Rotovisco viscometer.

Coatings compositions in which the pigment dispersions of the present invention are used contain a binder preferably of an acrylic-based polymer and a crosslinking agent such as a melamine crosslinking agent, a polyisocyanate crosslinking agent or a blocked polyisocyanate crosslinking agent in an organic liquid carrier which is usually a solvent for the binder constituents or can be a mixture of a solvent/non-solvent to form a NAD (non-aqueous dispersion). The ABC block polymers form stable solutions or dispersions. These coating compositions contain about 10–70%, more typically 15–50% by weight of binder, and about 30–90%, more typically 50–85% by weight, of the liquid carrier. Suitable coating compositions are prepared by blending other useful components in accordance with normal paint formulation techniques.

To form a composition which will crosslink under elevated baking temperatures of about 60–180° C. for about 5–60 minutes, 10 to 50%, preferably 15 to 30% by weight, based on the weight of the binder, of an alkylated melamine formaldehyde crosslinking agent having 1–4 carbon atoms in the alkylated group is preferred.

These crosslinking agents are generally partially or fully alkylated melamine formaldehyde compounds and may be monomeric or polymeric as described above. Blocked polyisocyanates can also be used as crosslinking agents.

These coating compositions containing a melamine crosslinking agent can contain about 0.1 to 1.0% by weight, based on the weight of a binder, of a strong acid catalyst or a salt thereof to lower curing temperatures and time. Para toluene sulfonic acid or its ammonium salt are preferred catalysts. Other catalysts that can be used are dodecyl benzene sulfonic acid, phosphoric acid and ammonium salts of these acids.

Other film forming polymers can also be used in these coating compositions such as acrylourethanes, polyesters and polyester urethanes, polyethers and polyether urethanes that are compatible with the dispersion of the branched polymer. A polyisocyanate can be used as a crosslinking agent to provide a coating composition that will cure at ambient temperatures.

In addition, coating composition utilizing the dispersion of the present invention may contain a variety of other optional ingredients, including fillers, plasticizers, antioxidants, surfactants and flow control agents.

To improve weatherability of a finish of such coating compositions, an ultraviolet light stabilizer or a combination of ultraviolet light stabilizers can be added in the amount of 0.1–5% by weight, based on the weight of the binder. The stabilizer may be added for example to a dispersion of this invention containing pigments or may be added directly to the coating composition. Such stabilizers include ultraviolet light absorbers, screeners, quenchers, and specific hindered amine light stabilizers. Also, an anitoxidant can be added, in the amount of 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), I BYK 320 and 325 (high molecular weight polyacrylates); rheology control agents, such as fumed silica.

Pigment dispersions of the present invention may be utilized in a mono coat or in a pigmented color coat or base coat over which a clear coat is applied to provide a color coat/clearcoat finish. Also, small amounts of pigment dispersion can be added to the clear coat to provide special color or aesthetic effects such as tinting.

Coating compositions formulated with the dispersion of this invention have excellent adhesion to a variety of metallic or non-metallic substrates, such as previously painted substrates, primed substrates, cold rolled steel, phosphatized steel, and steel coated with conventional primers by electrodeposition. These coating compositions can be used to coat plastic substrates such as polyester reinforced fiberglass, reaction injection-molded urethanes and partially crystalline polyamides. In particular, base coat or color coat composition formulated with the dispersion of this invention, provide improved intercoat adhesion between the primer layer and the base coat and improved adhesion to the clear top coat. This improved adhesion results in significantly improved chip resistance of the resulting finish which is very important property for automobile and truck finishes.

Coating compositions formulated with the dispersion of this invention can be applied by conventional techniques such as spraying, electrostatic spraying, dipping, brushing or flowcoating. The preferred techniques are spraying and electrostatic spraying. In OEM applications, the composition is typically baked at 100–150° C. for about 15–30 minutes to form a coating about 2.54–76.2 microns (0.1–3.0 mils) thick. When a clear coat is used, it is applied over the color coat that may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts, ratios and percentages are on a weight basis unless otherwise indicated. All molecular weights disclosed herein can be determined by GPC (gel permeation chromatography) using a polymethyl methacrylate standard.

The starting procedure was identical for all three of the block copolymers I–III below. All monomers and solvents were dried by passing them over 4A molecular sieves and stored under nitrogen before being used. A 5-liter round bottom 4-necked flask, was equipped with condenser/drierite tube, digital thermometer probe and $N_2$ inlet, mechanical stirrer and monomer addition funnel. Flask was then purged with $N_2$ and dried with a heat gun

EXAMPLE 1
Preparation of ABC Block Copolymer I

While flushing the flask with $N_2$, 1000.0 g THF (tetrahydrofuran) and 22.4 g 1-methoxy-1-trimethysiloxy-2-methylpropene (herein called methyl initiator) were added via addition funnel. Two grams mesitylene and 1.5 ml of a 1M solution of TBACB (tetrabutylammonium m-chlorobenzoate) in acetonitrile (herein called catalyst) were injected using two syringes and the first monomer feed was started. 258.9 g n BMA (normal butyl methacrylate), and 210.3 g MMA (methyl methacrylate), the primary components of the A block, were added via addition funnel over a period of 45 min. The temperature was kept below 40° C. by cooling the reaction flask with an ice bath. At 60 min. from the start, the monomer conversion was 99% or more complete and the second monomer feed (B block) was started via the same addition funnel. 132.0 g of DMAEMA monomer (the primary component of the B block, N,N-dimethylaminoethyl methacrylate) was added over a period of 45 min.. The temperature remained below 40° C. during this feed. At 120 min from the start, the third monomer feed was started for the C block of the polymer. The primary components of the C block were n-BMA, MMA and 2-[trimethylsiloxy] hydroxy ethyl methacrylate, TMS-HEMA. 298.7 n-BMA, 252.4 g MMA and 85.1 g TMS-HEMA were added via the same addition funnel over a period of 45 min. Reaction exotherm rose quickly and the ice bath was used to maintain the temperature below 40° C. In parallel with the monomer feeds, a feed of 1.5 ml TBACB in 6.2 g THF was fed to the reaction pot over 180 min. Monomer conversion (HPLC) at 270 min. was 99% or more complete for all monomers. 50 g methanol were added to quench the reaction. Next, 571.0 g THF were stripped out in two steps and replaced with 1200 g PM Ac (propylene glycol methyl ether acetate). 80.2 g BzCl (benzyl chloride) were added to quaternize the amino group of DMAEMA. Solution was refluxed for three hours, until the amine value was 0.08 mEq/gram solution. The resulting polymer solution has a polymer solids content of 43.0% and a number average molecular weight of about 9280. The ABC block polymer has the following mole ratio of constituents n-BMA/MMA//DMAEMA-BzCl//n-BMA/MMA/HEMA 13/15//6–4.5//15/18/3 (molar ratio), where n-BMA/MMA is the A-segment, DMAEMA is the B-segment and BMA/MMA/HEMA is the C-segment of the polymer.
Preparation of ABC Block Copolymer II While flushing the flask with $N_2$, 1258.6 g THF and 30.6 g methyl initiator were added via addition funnel. Two grams mesitylene and 2.5 mL of a 1 M solution of TBACB in acetonitrile were injected using two syringes and the first monomer feed (A block) was started. 325.2 g n-BMA and 262.6 g MMA, were added via addition funnel over a period of 45 min. The temperature was kept below 40° C. by cooling the reaction flask with an ice bath. At 60 min. from the start, the monomer conversion was 99.9% or more complete and the second monomer feed (B block) was started via the same addition funnel. 220.1 g DMAEMA was added over a period of 45 min. The temperature remained below 40° C. during this feed. At 120 min from the start, the third monomer feed was started (C block). 325.2 n-BMA, 227.8 g MMA and 106.3 g TMS-HEMA were added via the same addition funnel over a period of 45 min. Reaction exotherm rose quickly and the ice bath was used to maintain the temperature at or below 41.4° C. After 315 min from the start conversion of all monomers was 99% or more complete as determined by HPLC. At this point, 62.5 g methanol was added to quench the reaction. Next, 654.1 g THF was stripped out in two steps and replaced with 1375 g PM Ac. 133.8 g BzCl were added to quaternize the amino group of DMAEMA. The solution was refluxed for four hours, until the amine value was 0.108 mEq/gram solution. The resulting polymer solution has a polymer solids content of 43.19% and a number average molecular weight of about 9013. The ABC block polymer has the following mole ratio of constituents n-BMA/MMA//DMAEMA-BzCl//n-BMA/MMA/HEMA 13/15//8–6//13/13/3 (molar ratio), where n-BMA/MMA is the A-segment, DMAEMA is the B-20 segment and BMA/MMA/HEMA is the C-segment of the polymer.
Preparation of CBA Block Copolymer III While flushing the flask with $N_2$, 803.6 g THF and 30.1 g 1-methoxy-1-trimethysiloxy-2-trimethylsiloxyethylpropene (herein called hydroxyl blocked initiator) were added via addition funnel. Two grams mesitylene and 2.0 ml of a 1 M solution of TBACB in acetonitrile were injected using two syringes and the first monomer feed (C block) was started. 200.8 g n-BMA, 141.4 g MMA and 44.0 g TMS-HEMA were added via addition funnel over a period of 45 min. Temperature rose to 58.7° C. at the end of the first monomer feed. At 125 min. from the start, the monomer conversion was 99% or more complete as determined by HPLC. The second monomer feed (B block) was started via the same addition funnel. 136.7 g DMAEMA was added over a period of 45 min. The temperature remained below 40° C. during this feed. At 255 min from the start, the third monomer feed (A block) was started. 200.9 n-BMA, and 163.2 g MMA were added via the same addition funnel over a period of 45 min. Temperature rose to 58.8° C. due to the reaction exotherm. No cooling was applied this time. After 360 min from the start conversion of all monomers was 99.5% or more complete. 35.2 g methanol were added to quench the reaction. Next, 512.8 g THF was stripped out in two steps and replaced with 1000 g PM Ac. Finally, 82.9 g BzCl were added to quaternize the amino group of DMAEMA. The solution was refluxed for 120 min, until the amine value was 0.0969 mEq/gram solution. The resulting polymer solution has a polymer solids content of 39.87% and a number average molecular weight of about 8904. The CBA block polymer has the following mole ratio of constituents n-BMA/MMA/HEMA //DMAEMA-BzCl//n-BMA/MMA 13/15/3//8–6//13/15 (molar ratio), where BMA/MMA/HEMA is the C-segment, DMAEMA is the B-segment and n-BMA/MMA is the A-segment of the polymer.
Preparation of ABA Block Copolymer IV An ABA block copolymer was prepared using the procedure of West U.S. Patent 4,812,517. The same monomers in the same ratio were used as above to form the A and B segments of the above copolymer II.
Preparation of Pigment Dispersions A-O Each of the pigments shown in Table 2 following was formulated into a pigment dispersion using the above prepared ABC block polymer I as the pigment dispersant. A second set of pigment dispersions was prepared using the above prepared ABC block copolymer II as the pigment dispersant and a third set of dispersions (control) was prepared using the ABA block copolymer IV as the pigment dispersant.

Each of the pigment dispersion were prepared by adding 1 gram solids of the pigment dispersant, 2 grams of pigment, 20 grams of butyl acetate and 15 grams of coarse sand to a 2 oz. screw-cap bottle. The bottle was then shaken for 20 minutes in a paint shaker.

Each of the above prepared dispersions were tested and rated for quality using optical microscopy. Table 1 shows the results of this evaluation. Ratings of 0 to 1 denote good quality dispersions with deflocculated (stable) pigments. A rating of 2 to 3 indicates poor quality dispersions having flocculated (unstable) particles.

The ABC block polymer dispersants I & II display a broad interaction with the test pigments (all pigments were deflocculated). Dispersions made with the ABA block copolymer IV (control) were either equal to or poorer than the dispersions made with ABC block copolymers I & II.

Also shown in Table 1 are microscope ratings after 2 grams of methanol were added to each of the dispersions. Methanol is used as a polar displacer to test the strength of the pigment-dispersant interaction. Results show that the interaction between pigment and ABC block polymer dispersant is strong enough to withstand displacement by methanol in all but one case. In comparison to the dispersions made with the ABA block copolymer (control), the dispersions made with ABC block copolymers I & II gave equivalent or better results than the ABA block copolymer control with the exception of the dispersions made with pigment A in which the ABA block copolymer gave better dispersion with less flocculation.

TABLE 1

| | Microscope Ratings | | | | | |
| | Initial | | | After addition of methanol | | |
| Pigment | ABA Control | ABC Dispersant I | ABC Dispersant II | ABA Control | ABC Dispersant I | ABC Dispersant II |
|---|---|---|---|---|---|---|
| A | 0 | 0 | 0 | 1 | 0 | 2 |
| B | 0–1 | 0 | 0 | 2–3 | 0–1 | 0–1 |
| C | 0 | 0 | 0 | 1–2 | 1 | 0 |
| D | 0–1 | 0 | 0 | 1 | 0–1 | 0 |
| E | 0 | 0 | 0 | 0 | 0 | 0 |
| F | 0 | 0 | 0 | 1 | 0 | 0 |
| G | 0 | 0 | 0 | 0 | 0 | 0 |
| H | 0 | 0 | 0 | 0 | 0 | 0 |
| I | 0–1 | 0–1 | 0 | 0 | 0 | 0 |
| J | 0–1 | 0 | 0 | 0 | 0 | 0 |
| K | 1 | 0 | 0 | 1 | 0 | 0 |
| L | 1 | 0–1 | 0 | 0 | 0 | 0 |
| M | 0 | 0–1 | 0 | 0 | 0 | 0 |
| N | 1 | 0–1 | 0–1 | 1–2 | 0–1 | 0–1 |
| O | 0–1 | 1 | 0–1 | 0 | 1 | 1 |

TABLE 2

| Pigment | Description | Supplier |
|---|---|---|
| A | QA Monastral Red Y RT-759D | Ciba |
| B | DPP Red BO | Ciba |
| C | Hostaperm Yellow H3G | Clariant |
| D | Sunfast Green 7 | Sun |
| E | Transparent iron oxide | BASF |
| F | TiO2 R706 | DuPont |
| G | Irgacolor Yellow Bismuth Vanadat | Ciba |
| H | Opaque iron oxide | Bayer |

TABLE 2-continued

| Pigment | Description | Supplier |
|---|---|---|
| I | Perylene Maroon R-6436 | Bayer |
| J | Endurophthal blue BT-617D | Clariant |
| K | Irgazin blue X-3367 | Ciba |
| L | QA Magenta RT-355D | Ciba |
| M | Irgazin blue ATC | Ciba |
| N | Violet RT-101D | Ciba |
| O | Jet Black Raven 5000 | Columbian |

We claim:

1. A pigment dispersion, useful for forming coating compositions, containing dispersed pigment, a non-aqueous carrier liquid and an ABC-block polymer dispersant; wherein:

the ABC block polymer has a number average molecular weight of about 5,000–20,000 and contains a polymeric A segment, a polymeric B segment and a polymeric C segment; wherein the polymeric A segment of the block polymer consists essentially of polymerized monomers selected from the group consisting of alkyl (meth)acrylate monomers having 1–12 carbon atoms in the alkyl group, aryl (meth)acrylate monomers, cycloalkyl (meth)acrylate monomers or mixtures of any of the above;

the polymeric B segment of the block polymer consists essentially of polymerized alkyl amino alkyl (meth) acrylate monomers having 1–4 carbon atoms in the alkyl group quaternized with an alkylating agent; and the polymeric C segment of the block polymer consists essentially of polymerized monomers of hydroxy alkyl (meth)acrylate having 1–4 carbon atoms in the alkyl group and polymerized monomers selected from the group consisting of alkyl (meth)acrylate monomers having 1–12 carbon atoms in the alkyl group, aryl (meth)acrylate monomers, cycloalkyl (meth)acrylates monomers and any mixtures thereof and optionally contains polymerized monomers selected from the group consisting of glycidyl (meth)acrylates and polyalkylene glycol (meth)acrylate;

wherein the weight ratio of pigment to dispersant in the dispersion is about 1/100–200/100.

2. The pigment dispersion of claim 1 in which the ABC block polymer is prepared by group transfer polymerization.

3. The pigment dispersion of claim 2 wherein the polymeric A segment consists of polymerized monomers selected from the group consisting of of alkyl (meth)acrylate monomers, aryl (meth)acrylate monomers and cycloalkyl (meth)acrylate monomers.

4. The pigment dispersion of claim 3 wherein the polymeric A segment consists of polymerized monomers selected from the group consisting of methyl methacrylate, butyl methacrylate, benzyl methacrylate, isobornyl methacrylate and any mixtures thereof.

5. The dispersion of claim 2 wherein the polymeric B segment of the ABC block polymer consists essentially of polymerized monomers of dialkyl aminoalkyl (meth) acrylate having 1–4 carbon-atoms in the alkyl group and which is quaternized with an alkylating agent consisting of

$$R-CH_2-X$$

where R is selected from the group consisting of H, a lower alkyl group having 1–4 carbon atoms and an aromatic group; and X is selected from the group consisting of iodide, chloride, a sulfate group and a sulfate group.

6. The dispersion of claim 5 in which the polymeric B segment of the ABC block polymer consists of polymerized monomers of dimethyl amino ethyl methacrylate and the quaternizing agent is benzyl chloride.

7. The dispersion of claim 2 in which the polymeric C segment of the ABC block polymer consists essentially of polymerized monomers of a hydroxyalkyl (meth)acrylate having 1–4 carbon atoms in the alkyl group, and polymerized monomers selected from the group consisting of alkyl (meth)acrylate monomers having 1–12 carbon-atoms in the alkyl group, aryl(methacrylate)monomers and cycloalkyl (meth)acrylate monomers, and optionally contains polymerized monomers selected from the group consisting of epoxyalkyl methacrylates, polyalkylene glycol (meth)acrylates, and alkoxy polyalkylene glycol (meth)acrylates.

8. The dispersion of claim 7 in which the polymeric C segment of the ABC block polymer consists of polymerized monomers of a hydroxyethyl methacrylate and polymerized monomers selected from the group consisting of, butyl methacrylate, methyl methacrylate, benzyl methacrylate, isobornyl methacrylate and any mixtures thereof.

9. The dispersion of claim 8 in which the polymeric C segment contains in addition polymerized monomers of glycidyl methacrylate and ethoxy triethylene glycol methacrylate.

10. The dispersion of claim 2 in which the ABC block polymer consists of a polymeric A segment of polymerized monomers of methyl methacrylate, butyl methacrylate, the polymeric B segment consists of polymerized monomers of diethyl amino ethyl methacrylate, the alkylating agent consists of benzyl chloride; and the polymeric C segment consists of polymerized monomers of methyl methacrylate, butyl methacrylate and hydroxy ethyl methacrylate.

11. A coating composition which comprises an organic liquid carrier and a film forming binder and about 1–50% by weight of the pigment dispersion of claim 1.

12. A process for preparing the dispersion of claim 2 in which the ABC block polymer is formed by the process comprising
  (a) preparing the A segment of the polymer in an organic solvent in the presence of a group transfer polymerization catalyst and initiator by polymerizing monomers selected from the group consisting of alkyl (meth) acrylate monomers having 1–12 carbon atoms in the alkyl group, aryl (meth)acrylate monomers, cycloalkyl (meth)acrylate monomers and any mixtures thereof;
  (b) polymerizing B segment monomers of alkyl amino alkyl (meth)acrylate having 1–4 carbon atoms in the alkyl group; in the presence of the A-segment of the polymers;
  (c) polymerizing C segment monomers of hydroxy alkyl (meth)acrylate having 1–4 carbon atoms in the alkyl group and monomers selected from the group consisting of alkyl(meth)acrylate monomers having 1–12 carbon atoms in the alkyl group, aryl (meth)acrylate monomers, cycloalkyl (meth)acrylate monomers or any mixtures thereof in the presence of the AB segments formed in steps (a) and (b) to form the ABC block polymer having a weight average molecular weight of about 5,000–20,000;
  (d) quaternizing the amino groups of the polymer with an alkylating agent; and forming a non-aqueous dispersion of the resulting ABC block polymer and
  (e) dispersing pigment in the ABC block polymer dispersion to form the pigment dispersion.

13. A process for preparing pigment dispersion useful for forming coating compositions containing dispersed pigment, a non-aqueous carrier liquid and an CBA-block polymer dispersant;
  wherein the CBA-block polymer is formed by the process comprising
  (a) preparing the C segment of the polymer in an organic solvent in the presence of a group transfer polymerization catalyst and initiator by polymerizing blocked hydroxy alkyl (meth)acrylate monomers having 1–4 carbon atoms in the alkyl group and monomers selected from the group consisting of alkyl(meth)acrylate monomers having 1–12 carbon atoms in the alkyl group, aryl (meth)acrylate monomers, cycloalkyl (meth)acrylate or any mixtures thereof;
  (b) polymerizing B segment monomers of alkyl amino alkyl (meth)acrylate having 1–4 carbon atoms in the alkyl group; in the presence of the C-segment of the polymers;
  (c) polymerizing A segment monomers consists essentially of polymerized monomers selected from the group consisting of alkyl (meth)acrylate monomers having 1–12 carbon atoms in the alkyl group, aryl (meth)acrylate monomers, cycloalkyl (meth)acrylate monomers or mixtures of any of the above in the presence of the C and B segments formed in steps (a) and (b) to form the CBA block polymer having a weight average molecular weight of about 5,000–20,000;
  (d) quaternizing the amino groups of the polymer with an alkylating agent; and forming a non-aqueous dispersion of the resulting CBA block polymer and
  (e) dispersing pigment in the CBA block polymer dispersion to form the pigment dispersion.

* * * * *

UNITED STATES PATENT AND TRADEMARK OFFICE
CERTIFICATE OF CORRECTION

PATENT NO. : 6,413,306 B1
DATED : July 2, 2002
INVENTOR(S) : Kraiter et al.

It is certified that error appears in the above-identified patent and that said Letters Patent is hereby corrected as shown below:

Title page, Item [54] and Column 1, line 1,
Before "PIGMENT" insert -- NON-AQUEOUS --

Column 8,
Line 21, delete "-20"

Column 11,
Line 2, delete "sulfate group" and substitute thereof -- sulfonate group --

Signed and Sealed this

Twenty-seventh Day of May, 2003

JAMES E. ROGAN
*Director of the United States Patent and Trademark Office*